(12) United States Patent
Leoshko

(10) Patent No.: US 11,994,103 B2
(45) Date of Patent: May 28, 2024

(54) VERTICAL-AXIS WIND TURBINE

(71) Applicant: Anatolij Viktorovich Leoshko, Sankt-Peterburg (RU)

(72) Inventor: Anatolij Viktorovich Leoshko, Sankt-Peterburg (RU)

( * ) Notice: Subject to any disclaimer, the term of this patent is extended or adjusted under 35 U.S.C. 154(b) by 0 days.

(21) Appl. No.: 17/784,985

(22) PCT Filed: Dec. 16, 2019

(86) PCT No.: PCT/RU2019/000952
§ 371 (c)(1),
(2) Date: Jun. 13, 2022

(87) PCT Pub. No.: WO2021/125994
PCT Pub. Date: Jun. 24, 2021

(65) Prior Publication Data
US 2023/0008558 A1   Jan. 12, 2023

(51) Int. Cl.
*F03D 3/00* (2006.01)
*F03D 3/04* (2006.01)
*F03D 3/06* (2006.01)

(52) U.S. Cl.
CPC ........... *F03D 3/005* (2013.01); *F03D 3/0427* (2013.01); *F03D 3/061* (2013.01); *F03D 3/062* (2013.01);
(Continued)

(58) Field of Classification Search
CPC ...... F03D 3/005; F03D 3/0409; F03D 3/0418; F03D 3/0427; F03D 3/061; F03D 3/064;
(Continued)

(56) References Cited

U.S. PATENT DOCUMENTS 1,519,447 A * 12/1924 Fortier-Beaulieu .......................... F03D 3/0409
   415/4.4
4,309,146 A * 1/1982 Hein ..................... F03D 3/0409
   415/4.4

(Continued)

FOREIGN PATENT DOCUMENTS

DE   3636248 A1   5/1988
RU   2268396 C2   1/2006
(Continued)

OTHER PUBLICATIONS

International Search Report and Written Opinion dated Sep. 3, 2020 in corresponding application No. PCT/RU2019/000952; w/English partial translation and partial machine translation (total 13 pages).
(Continued)

*Primary Examiner* — John M Zaleskas
(74) *Attorney, Agent, or Firm* — Seckel IP, PLLC

(57) ABSTRACT

The wind turbine includes a rotor 6 and a stator 1 mounted coaxially therewith and provided with lower 2 and upper 3 support structures interconnected by vertical guide vanes 4 of the stator, oriented outward. A confuser 22 with blades 23 is mounted on the lower support structure 2, and a diffuser 9 is mounted at least partially above the stator 1. A lower disc 10 of the diffuser is rigidly attached to an upper part 11 of the diffuser that serves as the upper support structure 3 of the stator. Lower 19 and upper 16 half-axles of rotation of the rotor are installed in upper 17 and lower 21 support members, respectively. A rotor body 7 is made in the general approximate form of a hollow truncated cone tapering upward having a curvilinear surface, preferably hyperbolic. Rotor blades 8 have a curvilinear surface, preferably hyperbolic, and are installed on an outer surface of the rotor body 7. Upper 13 and lower 14 impellers with curvilinear blades 15 and 20 are mounted inside the rotor body. A rotor fan 25

(Continued)

is additionally installed inside a cavity 24 of the lower disc 10 of the diffuser 9. The blades of the fan are wrapped around the upper part of the outer surface of the rotor body 7. Spacing of the blades of the upper impeller 13 is chosen to be greater than a blade spacing of the fan 25.

5 Claims, 3 Drawing Sheets

(52) U.S. Cl.
CPC .......... *F03D 3/064* (2013.01); *F05B 2240/12* (2013.01); *F05B 2240/13* (2013.01); *F05B 2250/17* (2013.01); *F05B 2250/27* (2013.01)

(58) Field of Classification Search
CPC .. F03D 3/065; F05B 2240/12; F05B 2240/13; F05B 2250/17; F05B 2250/27; Y02E 10/74
See application file for complete search history.

(56) References Cited

U.S. PATENT DOCUMENTS

| | | | | |
|---|---|---|---|---|
| 4,452,046 | A * | 6/1984 | Valentin | F03D 9/39 60/641.11 |
| 4,508,973 | A * | 4/1985 | Payne | F03D 1/04 290/55 |
| 6,590,300 | B1 * | 7/2003 | Preito Santiago | F03D 9/007 60/641.11 |
| 6,740,989 | B2 | 5/2004 | Rowe | |
| 2004/0113431 | A1 | 6/2004 | Huang | |
| 2009/0256360 | A1 * | 10/2009 | Candelas Perez | F03D 3/005 290/55 |
| 2014/0196456 | A1 | 7/2014 | Zhou et al. | |
| 2016/0377053 | A1 * | 12/2016 | Reyna | F03D 3/005 415/210.1 |
| 2017/0045034 | A1 * | 2/2017 | Lai | F03D 3/0427 |

FOREIGN PATENT DOCUMENTS

| | | |
|---|---|---|
| RU | 2286477 C2 | 10/2006 |
| RU | 117522 U1 | 6/2012 |
| RU | 2488019 C1 * | 7/2013 |
| RU | 2488019 C1 | 7/2013 |
| SU | 408049 A1 | 12/1973 |
| WO | 2013037202 A1 | 3/2013 |

OTHER PUBLICATIONS

Russian Notice of Allowance with Search Report dated Dec. 12, 2022 in counterpart application No. RU2022115847/12; w/English machine translation (total 18 pages) (note: RU2488019, D1; RU117522, D2; and WO2013037202, D3 cited in the Russian Notice of Allowance are not isted in this IDS since they were already listed in the IDS filed Jun. 13, 2022).
EP Supplemental Search Report and Written Opinion dated Aug. 11, 2023 in corresponding application No. EP 19956305 (in English; total 5 pages) (note: D1, RU2488019 cited in the Supplemental EP Search Report dated Aug. 11, 2023 is not listed in this IDS since it is already of record).
AU Office Action dated Aug. 25, 2023 in corresponding application AU 2019479010 (in English; 3 pages).
CA Office Action dated Aug. 31, 2023 in corresponding application CA 3164675 (in English; 5 pages).

* cited by examiner

VERTICAL-AXIS WIND TURBINE

FIELD OF THE INVENTION

The invention relates to wind energy, and specifically, to wind motors having a vertical axis of rotation of the rotor relative to the horizon, and can be used to convert the energy of the air flow into a rotary motion, transmitted to an electric generator, a pump, or a different rotating mechanism.

PRIOR ART

A wind turbine is known, which comprises a rotor placed vertically with the possibility of rotation inside a housing and provided with blades [patent DE 3636248, IPC F03D 9/00, publ. 05.05.1988]. In the known system, the wind turbine is installed inside a pipe and operates in an upward flow of air using a chimney effect.

Another known wind turbine [patent RU 2286477, IPC F03D 1/02, publ. 27 Oct. 2006] comprises a rotor placed inside a stationary body (stator) with the possibility of rotation therewithin. The rotor consists of a shaft with radial-type turbine blades installed vertically along the circumference at a given distance from the center and attached to the rotor shaft by means of brackets (cross-pieces). The stator is made in the form of a guiding apparatus, consisting of vertically arranged guide vanes mounted at an acute angle to the outer edge of the radial-type turbine blades, which form external wind flow channels located tangentially with respect to an inner circumference of the system. A lower part of the rotor is made in the form of an axial turbine. The shaft is equipped with axial rotor blades designed to operate in the flow of air coming out of the guide vanes. Additional guide vanes are installed in the lower part of the body and are arranged radially inside a shell. A lower end of the rotor rests on a fairing, which is rigidly attached to the ends of the vanes of the guiding apparatus. An upper part of the shell is fastened to the body, while a lower part is secured to an upper part of the hollow body (upward-pull pipe) with a confuser installed thereon. Air supply windows are arranged in the lower part of the hollow body.

The wind turbine system according to the patent RU 2286477 (2006) operates by using the energy of horizontal wind flows, as well as the energy of upward flows developing in the hollow body provided with the confuser. However, in this design, the upward flows of air are not picked up by the horizontal ones. Instead, they partially block such horizontal flows and slow them down. A chaotic uncontrolled mixing of two practically perpendicular flows results in the formation of a significant and uncontrolled turbulence in the upper zone, which therefore reduces the system efficiency. This "counteraction" increases as the force of the horizontal wind flows becomes greater.

An increase in performance efficiency of a wind turbine is achieved in a wind turbine system [patent RU 2488019, IPC F03D 3/06, F03D 3/04, publ. 20 Jul. 2013], which comprises a stator with upper and lower support structures interconnected by vertical inward-oriented guide vanes. A rotor provided with longitudinal blades is placed in the stator. A body of the rotor is made in the form of a hollow cone tapering upward. Rotor blades are installed on its outer surface and are oriented at an angle to an axis of symmetry of the rotor. Plate-like cross-pieces are installed in an inner cavity of the rotor, connecting it with upper and lower half-axles of rotation. The lower support structure of the stator is configured to allow air to enter the rotor. The upper support structure of the stator has a conical part directed and tapering towards the lower support structure, and is provided with an axial opening, a diameter of which is larger than an upper diameter of the rotor cone, so that an annular gap is formed between them. An additional impeller is installed on the upper half-axle of the rotor extending into the conical part of the upper support structure of the stator. The lower half-axle of the rotor is mounted on the lower support structure of the stator. The upper half-axle is connected to the upper support structure by means of radial ribs installed inside the conical part of the upper support structure. A lower confuser with the blades attached thereto is installed on the lower support structure.

The wind turbine system according to patent RU 2488019 (2013) has following disadvantages, which reduce its performance efficiency.

The conical part of the upper support member of the stator interferes with the operation of the entire system by shielding a low-pressure zone created under the upper impeller from the outer blades of the rotor. A rather small diameter of the upper impeller reduces the velocity of the upward flow. In addition, the system is not protected from atmospheric precipitations.

The objective of the invention is to increase the performance efficiency of the wind turbine having a vertical axis of rotation of the rotor without changing the geometric dimensions.

The technical result consists in increasing the power of the wind turbine by creating an enhanced air flow inside thereof.

DISCLOSURE OF THE INVENTION

The objective is achieved by the fact that in a wind turbine with a vertical axis of rotation of the rotor, which comprises a stator with lower and upper support structures interconnected by vertical guide vanes of the stator, a rotor body made in the general approximate form of a hollow truncated cone tapering upward, rotor blades installed on an outer surface of the rotor body, upper and lower half-axes of rotation of the rotor installed in upper and lower support members, respectively, an upper cross-piece, an upper impeller, a lower confuser with blades, wherein, according to the invention, the upper impeller is secured inside an upper part of the rotor body, a diffuser is installed above the stator and is made in the form of two spaced biconvex discs, a lower disc of the diffuser being rigidly connected to an upper disc of the diffuser, while serving as the upper support structure of the stator, the stator vanes have a curved surface and are oriented outward, the rotor body has a curved surface with the upper part thereof being secured to the upper half-axle of rotation of the rotor with the help of the upper impeller blades, the upper support member is secured to the upper support structure with the help of the upper cross-piece, a lower part of the rotor body comprises a lower impeller, the blades of which are used to connect the rotor body with the lower half-axle of rotation of the rotor, the lower support member of which is secured at the top of the confuser, a cavity of the lower disc of the diffuser additionally comprises a rotor fan, blades of which are wrapped around the upper part of the outer surface of the rotor body, while a blades spacing of the upper impeller is selected to be greater than a blades spacing of the fan.

Preferably, the surface of the rotor body and the rotor blades have a hyperbolic shape.

In addition, the stator vanes are configured to enable a change in an angle of inclination relative to the vertical axis of the stator.

An increase in power of the wind turbine is achieved by the fact that an upward vortex flow is created inside and outside the rotor, which redirects the horizontal wind flows inside the system, including those in a wind shadow area, into a vertical flow with a swirling effect.

EMBODIMENTS OF THE INVENTION

Figure 1:
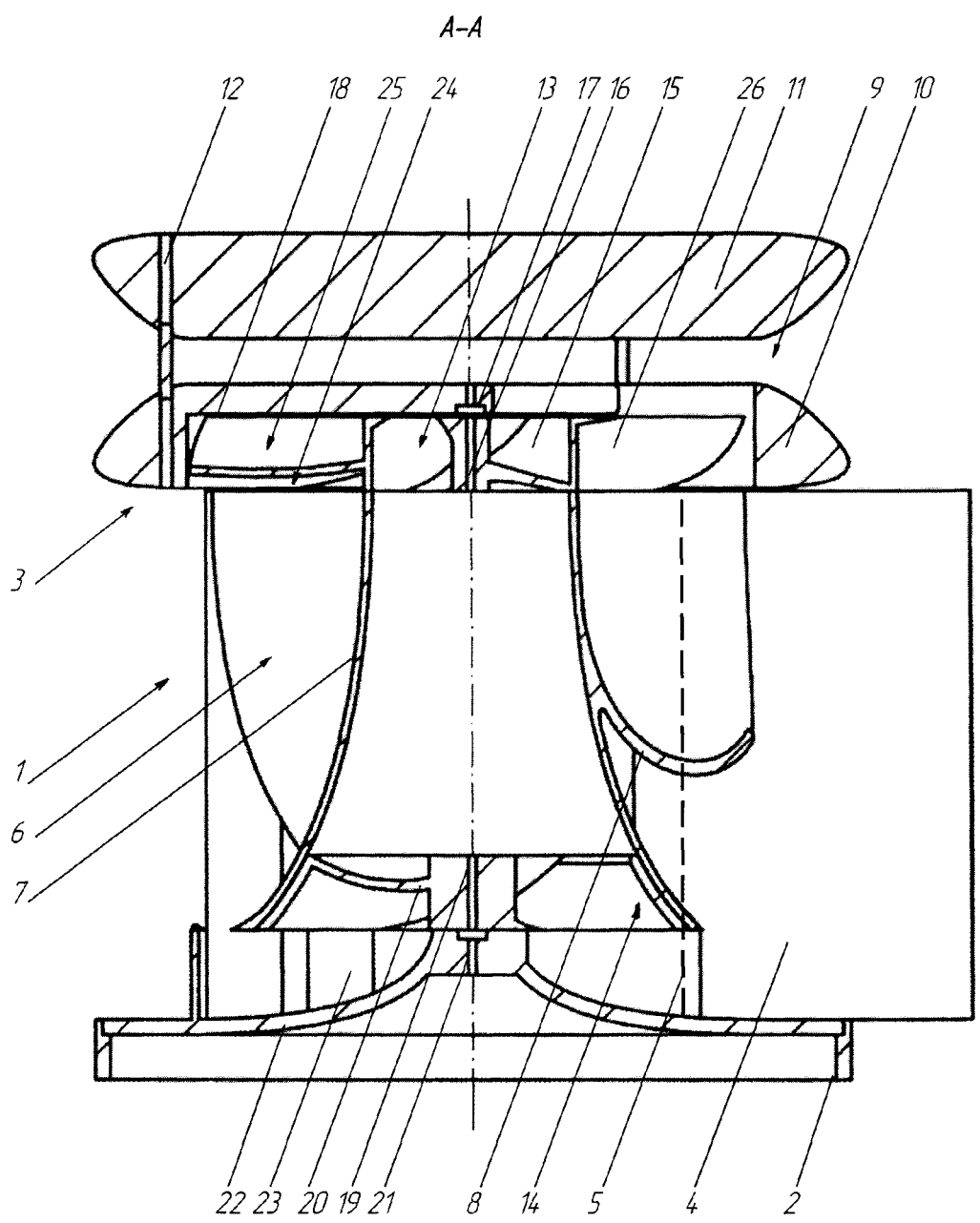
FIG. 1 shows a longitudinal axial cross-section (A-A in FIG. 3)
Figure 2:
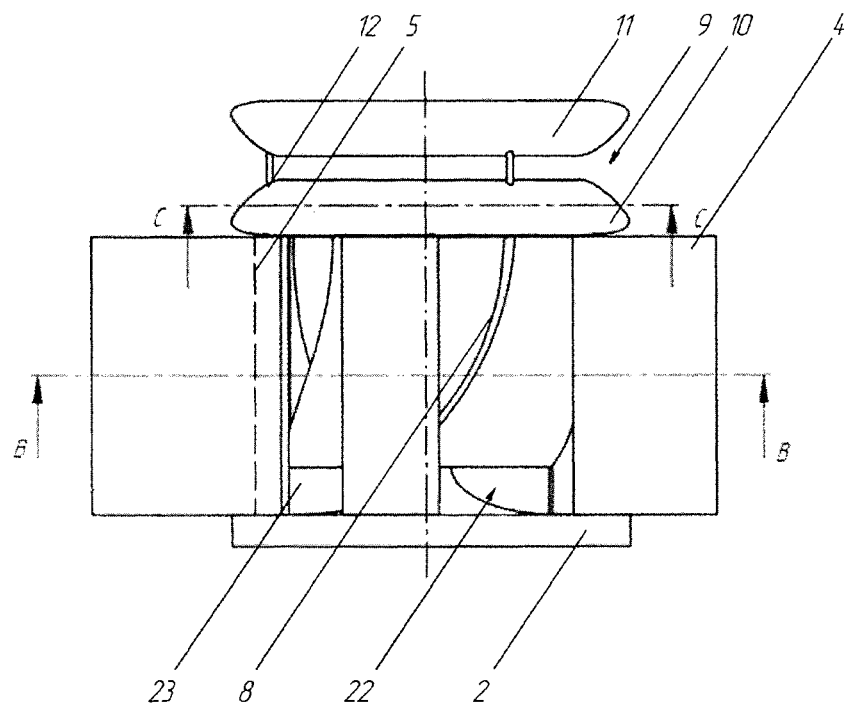
FIG. 2 shows a frontal view.
Figure 3:
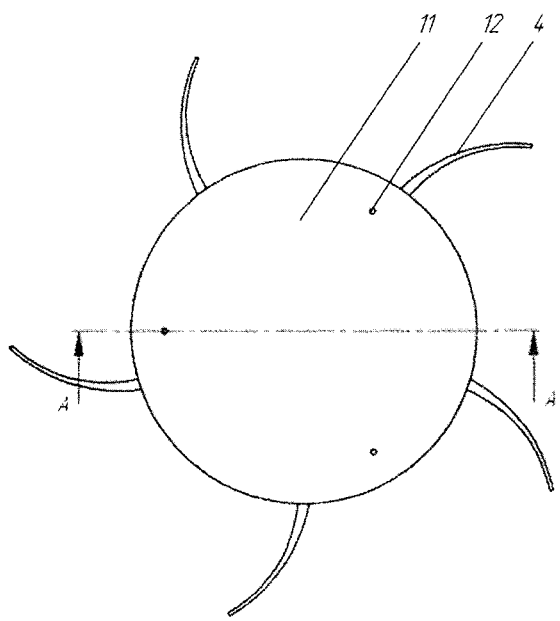
FIG. 3 shows a top view.
Figure 4:
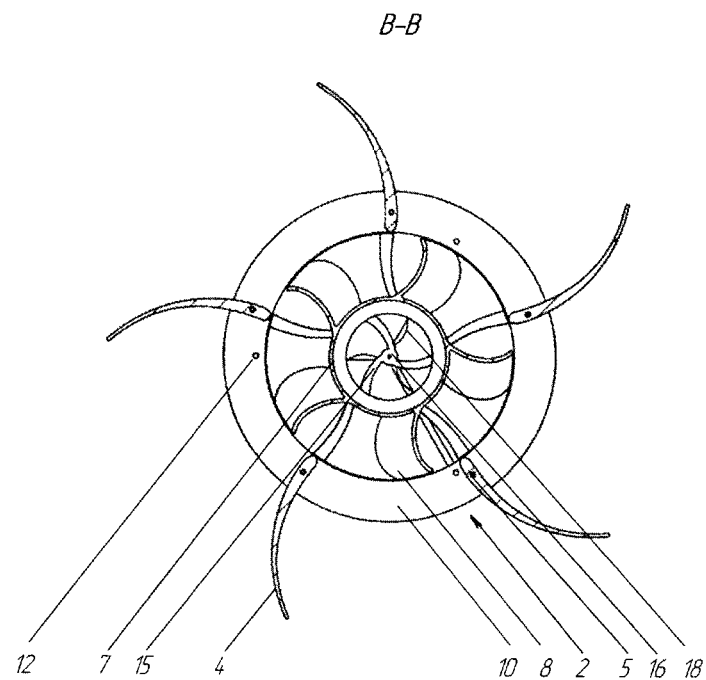
FIG. 4 shows a cross-section (B-B in FIG. 2)
Figure 5:
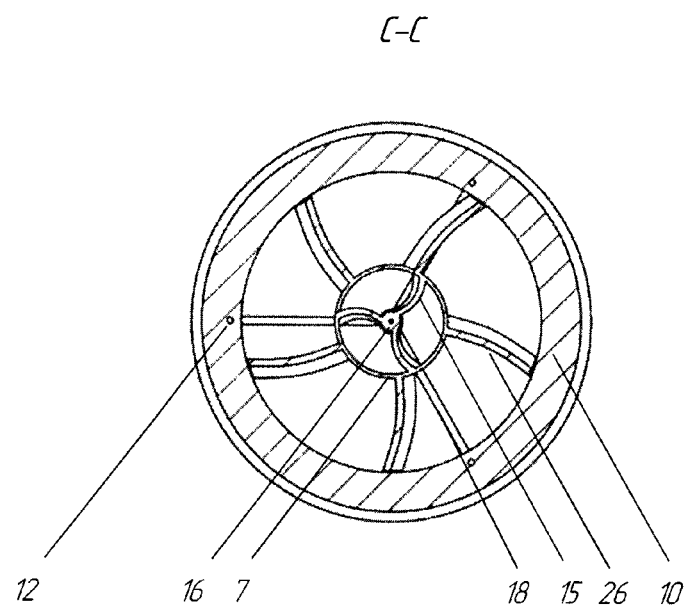
FIG. 5 shows a cross-section (C-C in FIG. 2).

A wind turbine with a vertical axis of rotation of the rotor comprises a stationary stator 1 provided with a lower support structure 2 and an upper support structure 3. The support structures 2 and 3 are interconnected by vertical guide vanes 4 of the stator, oriented outward and configured to rotate relative to an axis 5. A rotor 6 is arranged inside the stator 1 and has a common axis of symmetry therewith. A rotor body 7 is made in the general approximate form of a hollow cone tapering upward, which has a curvilinear surface. It is preferable that the curvilinear surface of the rotor body has a hyperbolic shape.

Longitudinal blades 8 are installed on an outer surface of the rotor body 7 and are made in the form of curved ribs. The blades 8 are oriented at an angle to the axis of symmetry of the rotor. It is preferable that the surface of the rotor blades has a hyperbolic shape.

A diffuser 9 is installed at least partially above the stator 1 and is made in the form of two spaced biconvex discs, namely, an upper disc 11 and a lower disc 10 rigidly connected to the upper disc 11, the lower disc 10 serving as the upper support structure 3 of the stator. The connection between the diffuser discs can be achieved, for example, by using studs 12. The distance between the diffuser discs is selected to provide lower air pressure above the upper impeller of the rotor.

Upper 13 and lower 14 impellers of the rotor are secured inside the rotor body 7. Blades 15 of the upper impeller are used to secure the upper part of the rotor 6 to an upper half-axle of rotation 16 of the rotor, an upper support member 17 of which is attached to the upper support structure 2 by means of an upper cross-piece 18. Blades 20 of the lower impeller 14 of the rotor are used to connect the rotor 6 with a lower half-axle of rotation 19. A lower support member 21 of the rotor is secured at the top of a confuser 22 provided with blades 23.

A cavity 24 of the lower disc 10 of the diffuser additionally comprises a rotor fan 25, blades 26 of which are wrapped around the upper part of the outer surface of the rotor body 7.

A blade spacing of the upper impeller 13 is selected to be greater than a blade spacing of the fan 25 in order to equalize the flow velocities inside and outside the rotor body due to different angular velocities of the blades in the center of the rotor and the periphery thereof.

The transmission of the rotary motion of the rotor, for example, to an electric generator or a pump, is realized by means of the lower half-axle.

The wind turbine with a vertical axis of rotation of the rotor operates as follows.

A horizontal air flow hits the stator vanes 4. A part of the flow impacting the outer parts of the stator vanes is deflected outward by the vanes to bypass the rotor 6. Another part of the air flow impacts the inner surfaces of the stator vanes 4, becomes accelerated by them and impacts the rotor blades 8. In this case, due to the curvilinear shape of the surface of the rotor blades, an upward flow is formed along the outer surface of the rotor concurrently with the creation of a rotation torque for the entire rotor structure. This external upward flow impacts the blades of the fan 25 of the rotor, thus creating an additional rotor torque.

In the area of the stator's support structure 2, the resulting decrease in pressure causes the air flow from below to enter the confuser 22, where the vertical air flow velocity increases, the flow is swirled due to the curvilinear shape of the confuser blades 23, and an upward flow entering the rotor body 7 is formed. The internal air flow sequentially impacts the lower impeller 14 and then the upper impeller 13, therefore increasing the rotor torque.

Thus, two upward vortex flows are realized in the proposed design, one—on the outer surface of the rotor, and another—inside thereof. One vortex picks up and additionally swirls the other. This leads to an increase in the wind turbine torque in general. A series of sequentially installed blades of the confuser, as well as upper and lower impellers contributes to the creation and stage-wise amplification of the vortex flows inside the rotor body, which makes it possible to gradually enhance the effect of increasing rotor torque.

The entire structure as a whole creates the motion of the enhanced air flow inside the wind turbine, including a wind shadow area, due to acceleration of the air flow by the confuser, internal impellers 13 and 14 of the rotor, rotor blades 8, as well as creation of the area of low air pressure by the fan 25 and diffuser 9.

The upper disc 11 of the diffuser protects the structure from atmospheric precipitation. In addition, the proposed wind turbine with a vertical axis of rotation of the rotor is characterized by a low sound emission due to the absence of planes moving in parallel with different speeds.

The invention claimed is:

1. A wind turbine, comprising:
   a stator having lower and upper support structures interconnected by vertical guide vanes of the stator,
   a rotor comprising a rotor body having a general approximate shape of a hollow truncated cone tapering upward, and rotor blades installed on an outer surface of the rotor body,
   upper and lower support members,
   upper and lower half-axles or rotation of the rotor installed in the upper and lower support members respectively, wherein the upper and lower half-axles define a vertical axis of rotation of the rotor relative to the stator,
   a cross-piece, the upper support member being secured to the under support structure of the stator with the help of the cross-piece,
   an upper impeller secured inside an upper part of the rotor body, the upper part of the rotor body being secured to the upper half-axle for rotation of the rotor with the help of blades of the upper impeller,
   a lower impeller arranged in a lower part of the rotor body, wherein blades of the lower impeller connect the rotor body with the lower half-axle for rotation of the rotor,
   a confuser with blades, installed on the lower support structure of the stator, the lower support member being secured at a top of the confuser, a diffuser installed partially above the stator,
   the diffuser comprising two spaced biconvex discs, the two spaced biconvex discs including a lower disc and an upper disc, respectively, the lower disc being rigidly connected to the upper disc, while serving as the upper support member of the stator,
and
a rotor fan installed in a cavity of the lower disc of the diffuser, wherein blades of the rotor fan are wrapped around the outer surface of the rotor body, wherein a spacing of the blades of the upper impeller is greater than a spacing of the blades of the rotor fan,
wherein:
the guide vanes of the stator have a curved surface and are oriented outward, and
the outer surface of the rotor body has a hyperbolic shape.

2. The wind turbine according to claim 1, wherein a respective surface of each of the rotor blades has a hyperbolic shape.

3. The wind turbine according to claim 1, wherein the guide vanes of the stator are configured to enable a change in an angle of inclination of the guide vanes relative to the vertical axis.

4. A wind turbine, comprising:
a stator having lower and upper support structures interconnected by vertical guide vanes of the stator,
a rotor comprising a rotor body having a general approximate shape of a hollow truncated cone tapering upward, and rotor blades installed on an outer surface of the rotor body,
upper and lower support members,
upper and lower half-axles for rotation of the rotor installed in the upper and lower support members respectively, wherein the upper and lower half-axles define a vertical axis of rotation of the rotor relative to the stator,
a cross-piece, the upper support member being secured to the upper support structure of the stator with the help of the cross-piece,
an upper impeller secured inside an upper part of the rotor body, the upper part of the rotor body being secured to the upper half-axle for rotation of the rotor with the help of blades of the upper impeller,
a lower impeller arranged in a lower part of the rotor body, wherein blades of the lower impeller connect the rotor body with the lower half-axle for rotation of the rotor,
a confuser with blades, installed on the lower support structure of the stator, the lower support member being secured at a top of the confuser,
a diffuser installed at least partially above the stator, the diffuser comprising two spaced biconvex discs, the two spaced biconvex discs including a lower disc and an upper disc, respectively, the lower disc being rigidly connected to the upper disc, while serving as the upper support member of the stator, and
a rotor fan installed in a cavity of the lower disc of the diffuser, wherein blades of the rotor fan are wrapped around the outer surface of the rotor body, wherein a spacing of the blades of the upper impeller is greater than a spacing of the blades of the rotor fan,
wherein:
the guide vanes of the stator have a curved surface and are oriented outward, and
a respective surface of each of the rotor blades has a hyperbolic shape.

5. A wind turbine, comprising:
a stator having lower and upper support structures interconnected by vertical guide vanes of the stator,
a rotor comprising a rotor body having a general approximate shape of a hollow truncated cone tapering upward, and rotor blades installed on an outer surface of the rotor body,
upper and lower support members,
upper and lower half-axles for rotation of the rotor installed in the upper and lower support members respectively, wherein the upper and lower half-axles define a vertical axis of rotation of the rotor relative to the stator,
a cross-piece, the upper support member being secured to the upper support structure of the stator with the help of the cross-piece,
an upper impeller secured inside an upper part of the rotor body, the upper part of the rotor body being secured to the upper half-axle for rotation of the rotor with the help of blades of the upper impeller,
a lower impeller arranged in a lower part of the rotor body, wherein blades of the lower impeller connect the rotor body with the lower half-axle for rotation of the rotor,
a confuser with blades, installed on the lower support structure of the stator, the lower support member being secured at a top of the confuser,
a diffuser installed at least partially above the stator, the diffuser comprising two spaced biconvex discs, the two spaced biconvex discs including a lower disc and an upper disc, respectively, the lower disc being rigidly connected to the upper disc, while serving as the upper support member of the stator, and
a rotor fan installed in a cavity of the lower disc of the diffuser, wherein blades of the rotor fan are wrapped around the outer surface of the rotor body, wherein a spacing of the blades of the upper impeller is greater than a spacing of the blades of the rotor fan,
wherein:
the guide vanes of the stator have a curved surface and are oriented outward, and
the guide vanes of the stator are configured to enable a change in an angle of inclination of the guide vanes relative to the vertical axis.

* * * * *